Jan. 10, 1961 J. A. McDONNELL ET AL 2,968,027

DATA PROCESSING SYSTEM MEMORY CONTROLS

Filed Aug. 29, 1958

3 Sheets-Sheet 1

INVENTORS.
JAMES A. MCDONNELL
JOSEPH M. TERLATO
JACK E. GREENE

BY [signature]

AGENT

Jan. 10, 1961 J. A. McDONNELL ET AL 2,968,027

DATA PROCESSING SYSTEM MEMORY CONTROLS

Filed Aug. 29, 1958

3 Sheets-Sheet 2

RECORD CONTROL WORD

PROGRAM INSTRUCTION

TAPE INSTRUCTION

INITIAL STATUS WORD

FINAL STATUS WORD

United States Patent Office 2,968,027

Patented Jan. 10, 1961

2,968,027

DATA PROCESSING SYSTEM MEMORY CONTROLS

James A. McDonnell, Binghamton, Joseph M. Terlato, Bronx, and Jack E. Greene, Vestal, N.Y., assignors to International Business Machines Corporation, New York, N.Y., a corporation of New York Filed Aug. 29, 1958, Ser. No. 758,063

10 Claims. (Cl. 340—172.5)

The invention relates to data processing systems and, more specifically, to a novel storage, or memory, control system for enabling information to be stored into or extracted from scattered locations of the storage, or the memory.

One of the difficulties which has seriously limited the application of computers, or data processing systems, to business problems is the fact that information had to be pre-arranged into a desired order before it could be conveniently entered into the main storage system and the further fact that related blocks of information had to be placed in sequential locations. Otherwise, complex programming routines were required which resulted in lowering the speed of the computer operation and thus impairing its efficiency.

The main object of the present invention resides in the unique and novel controls for effecting the transfer into or out of non-sequential locations of the storage or a memory system.

Another object resides in the control of an information storage system that facilitates the transmission into or out of sequential or non-sequential locations thereof.

A more specific object facilitates sorting of information without requiring physical manipulation of the information as has been the practice in prior art systems.

Another specific object resides in the adaptability of novel record control word instructions for defining scattered locations in storage and yet avoiding complexities inherent in the program routine in systems of the prior art.

Other objects of the invention will be pointed out in the following description and claims and illustrated in the accompanying drawings, which disclose, by way of examples, the principle of the invention and the best mode, which has been contemplated, of applying that principle.

In the drawings:

Figs. 1*a* and 1*b* constitute the novel controls and the systems diagram for effecting the transmission of data into or from scattered locations of an information storage or a memory system.

As a preliminary to the explanation of the invention, it might be appropriate at this point to explain the various instruction formats used to control various systems operations and the scatter read/write operations. These instructions include a record control (RCW), a program instruction, and a tape instruction. In addition, there is an initial status word and a final status word, which words are machine generated in a manner to be explained.

Figure 2:
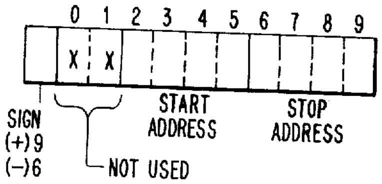
Fig. 2 shows the format of a record control word instruction.

Referring to Fig. 2, the record control word is an 11-digit word, the positions thereof reading from left to right being sign, 0–9, inclusive. The sign position may have either a plus, represented by a 9, or a minus, represented by a 6. Positions 0 and 1 are not used. Positions 2–5, inclusive, specify the address of the initial location in storage where a data word is to read into or read out of. Positions 6–9, inclusive, specify the address of the final location of the word in the block of words in storage.

Figure 3:
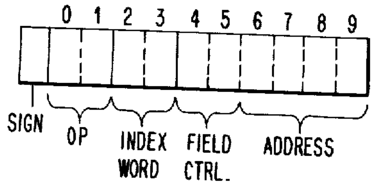
Fig. 3 shows the format of a typical program instruction.

The program instruction, as seen in Fig. 3, is an 11-digit word containing a sign; a 2-digit operation code, positions 0 and 1; a 2-digit index word address, positions 2 and 3; a 2-digit word control, positions 4 and 5; and a 4-digit address, positions 6–9, inclusive. The word control in positions 4 and 5 is used to define field length or size of a word, as well as other control information, depending upon the nature of the operation code. The 4-digit address generally specifies the operation of an operand or some other word of instruction.

Figure 4:
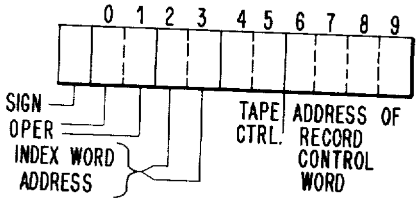
Fig. 4 shows the format of a tape control instruction.

The tape instruction format, shown in Fig. 4, is an 11-digit word containing sign and operation code, positions 0 and 1; a 2-digit index word, positions 2 and 3; two digits of tape control information in positions 4 and 5, position 4 specifying which tape unit of a group of tape units is to be controlled while position 5 specifying what operation the selected tape unit is to perform. And, finally, a 4-digit address, positions 6–9, inclusive, which specifies the address of a record control word in storage or memory.

Figure 5:
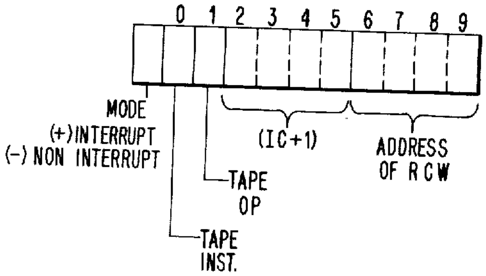
Figs. 5 and 6 show, respectively, the formats of an initial status word and a final status word.

The initial status word, shown in Fig. 5, is an 11-digit word containing a sign position in which a plus specifies an interrupt routine operation for the system and a minus sign specifies a non-interrupt routine operation. Position 0 contains the same digit as does position 0 of the tape instruction. Position 1 contains the same position specified in position 5 of the tape instruction, one digit specifying the operation; for example, read, or write, that the tape unit in question is to undergo. Positions 2–5, inclusive, contain the address of the control instruction plus one in the program routine, this address being taken from an instruction counter forming a part of the system. Positions 6–9, inclusive, contain the address of the initial record control word.

Figure 6:
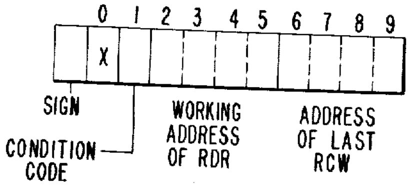

The final status word, shown in Fig. 6, is constituted as follows: sign; a condition code in position 1 which specifies the nature of the condition of the tape process just completed, the condition may be any one of several; for example, a short record, a long record, a correct length record, or any one of several kinds of errors, etc. Positions 2–5, inclusive, contain a working address; that is, the current address of the record definition register (RDR). Positions 6–9, inclusive, contain the address of the last record control word.

The initial status word and the final status word are assembled by the system respectively at the beginning and end of an operation. These words are entered into storage or memory in preselected locations from which they will be made available in the event it may be necessary to call for a correction program routine on the operation just concluded.

The data information and the instruction information processed through the system are represented in 2-out-of-5 code form constituted according to the table shown below:

| Dec. Values | Bit Values | | | | |
|---|---|---|---|---|---|
| | 6 | 3 | 2 | 1 | 0 |
| 0 | | | X | X | |
| 1 | | | | X | X |
| 2 | | | X | | X |
| 3 | | X | | X | |
| 4 | | X | | X | |
| 5 | | X | X | | |
| 6 | X | | | | X |
| 7 | X | | | X | |
| 8 | X | | X | | |
| 9 | X | X | | | |

Figure 1A:
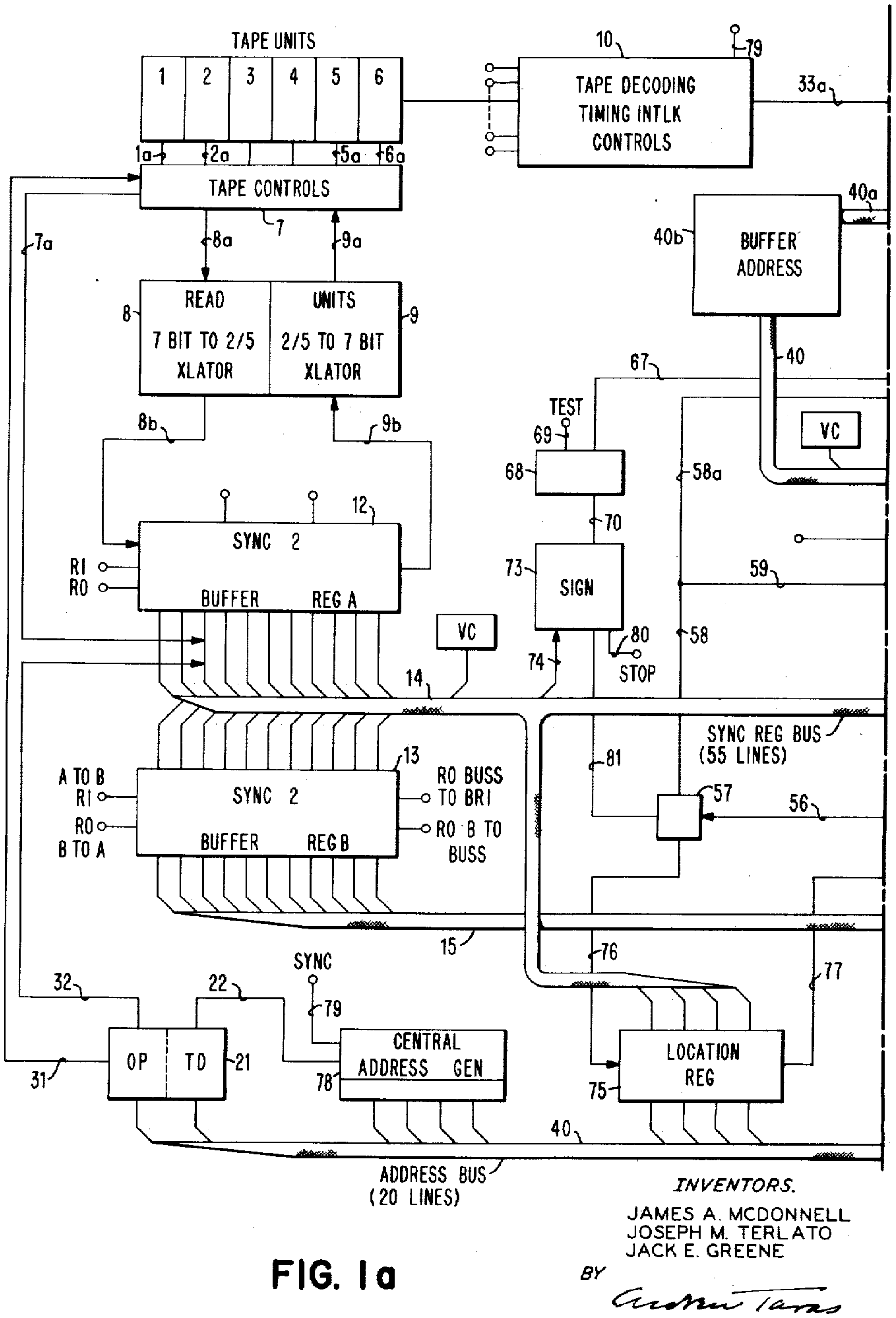
Figure 1B:
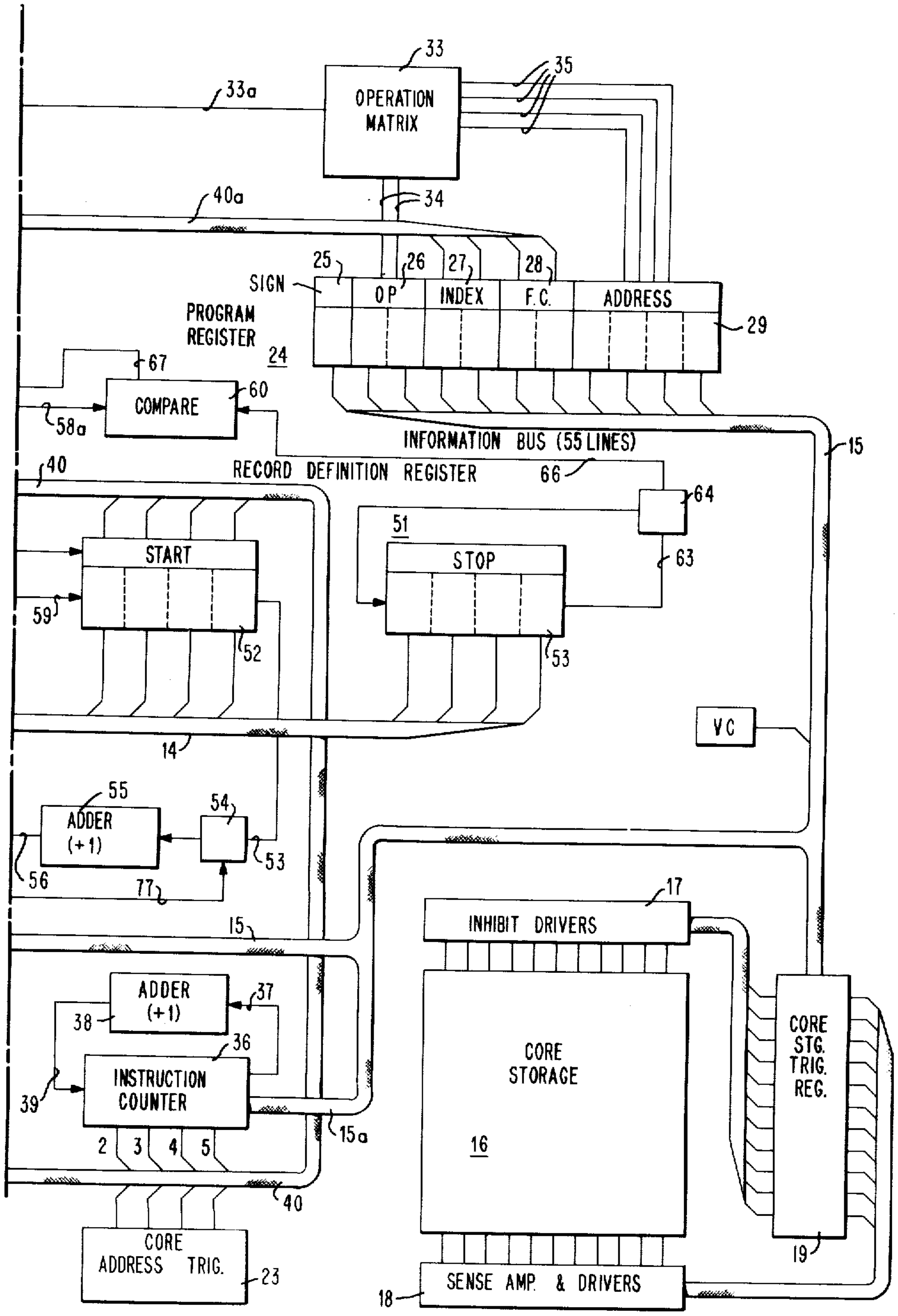

The data and instruction information is transmitted through the system by means of various flow paths and busses, shown in Figs. 1*a* and 1*b*. One such bus is identified as an Information bus 15 comprised of 55 lines over which a single word of eleven digits, including sign, is transmitted in parallel in a single memory, or storage, cycle. Another bus identified as an Address bus 40 is comprised of 20 lines over which a lesser number of characters are transmitted in parallel. A Sync. Reg. bus 14 is likewise comprised of 55 lines and over which information may be transmitted in parallel a word at a time. Single lines, except where specific mention is made thereof, generally are used to transmit control signals, timing signals, and gates. As seen in Figs. 1*a* and 1*b*, the system includes a plurality of tape drives 1–6, each of the type generally identified as an IBM Type 729 adapted to read or write data on magnetic tape under control of appropriate tape instructions; for example, the one shown in Fig. 4. The tape units 1–6 are connected to a tape Controls box 7 by way of lines **1*a*–6*a*. This box 7 is provided with timing and selection control circuits for enabling a particular one of the tape units to be selected for operation. Associated with the control unit 7 are translators 8 and 9**, respectively, for translation from a 7-bit code to a 2-out-of-5 code during a tape read operation and from a 2-out-of-5 code to a 7-bit code during a tape write operation.

The information directed either to or from the tape units 1–6 are processed through a Sync. which includes a pair of Sync. Bus Registers A and B, respectively referenced 12 and 13, the former being connected to the translators 8 and 9 by way of channel lines **8*b* and 9*b***.

The motion controls of the tape drives 1–6 and interlocking controls therefor are effected by way of a control unit 10 which is controlled in part by an Operation Matrix 33. The tape control 7 is further controlled by an operation and tape drive unit OPTD, referenced as 21, by way of line 31. This unit 21 stores the operation code directed to it from positions 4 and 5 of a tape instruction of the type shown in Fig. 4. The tape control unit 7 further provides a condition digit signal along a line **7*a* in turn connected to Sync. bus 14 to enable the condition digit signal to be stored in the buffer register 13**. This condition digit reflects the nature or condition of a tape operation.

The buffer register 12 has the ability of accepting information serially with either right or left shift, as well as being capable of accepting and transmitting information in parallel. The register 13 is capable of parallel operations only. Each register has a capacity of one word plus sign. Each register 12, 13, has parallel connections to the Sync. Reg. bus 14 comprised of 55 lines. Thus, for example, the contents of buffer register A12 may, in one interval of time, be transferred in parallel to the bus 14 and, in the next interval of time, the contents on the bus 14 may be read into the buffer register B13. The buffer register B13 also has parallel access to an Information bus 15 also comprised of 55 lines. This bus 15 transmits information, a word at a time, into and out of high speed core storage unit 16. The transmission of the information into or out of core storage is controlled by means of inhibit drivers 17, sense amplifiers and drivers 18, and a core storage trigger register 19.

The manner of addressing the core storage 16 for selecting a location therein is under control of Core Address Triggers 23 to which a 4-digit address is set up. The Address Triggers 23, by means not shown but well known, provide for selecting any one of up to 10,000 storage locations.

Programming the system to effect a routine operation is under control of a variety of instructions, two which are shown respectively in Figs. 3 and 4. For this operation there are provided a Program Register 24 comprised of individual registers; namely, a sign register 25, a 2-position OP register 26, a 2-position index register 27, a 2-position control register 28, and a 4-position address register 29. The instructions are usually stored in sequential locations in the memory 16 by means of a preliminary loading operation, the instructions being taken from an input peripheral device; for example, a tape unit or card input unit, not shown.

The interpretation of the instructions of a routine is effected by means of an Operation Matrix 33 connected to lines 34 and 35 through which are transmitted respectively the operation codes and the address information. The selection control of the instructions stored in memory are addressed by an Instruction Counter 36 which has parallel connections to the Core Address Triggers 23 which locates the instruction in the memory. The Instruction Counter 36 is advanced "one" every instruction operation by means of an Adder 38 connected to counter 36 by way of lines 37 and 39. The adder is essentially a translator capable of supplying an output greater by one over the input.

The structure adapted to provide the novel controls for scatter read or scatter write operations includes a Record Definition Register 51 having a 4-position Start register 52 and a Stop register 53. These registers are connected to the Sync. Reg. bus 14, through which the record control words are transmitted to the Start and Stop registers 52 and 53. The Start register 52 is further connected to an Adder 55 by means of a line 53, a switch 54, a line 56, a switch 57, and lines 58 and 59. The Stop register 53 has a regenerative path which includes a line 63, a switch 64, and a line 65.

A compare device 60 is connected to the Start and Stop registers in order to compare the Start and Stop registers contained therein. The Stop register 53 is connected to one side of the compare unit 60 by means of lines 63, switch 64, and line 66. The Start register 52 is connected to the opposite side of the compare unit 60 by means of lines 59 and **58*a*. An equal signal is transmitted from the compare unit by way of a line 67 to switch 68 also fed by a line 69 through which a sign test signal is passed at the appropriate time of an operation. A coincidence of these two signals enables a test signal to pass through a line 70 to test the character of the sign in a Sign latch 73 controlled by an input line 74 connected to the bus 14. The Sign latch 73 is employed to store the sign, or indicator, of the record control word fed into the Record Definition Register 51**.

The selection of the record control words from memory is effected by way of a 4-position Location register 75 having connections to the bus 14 by way of a bus **14*a*. The Location register 75 is also connected to the Adder 55 by way of lines 76 and 77**.

A Central Address Generator 78 is connected to the Address bus 40. This generator 78 is controlled by way of lines 22 and 79 to provide the selection of fixed memory locations for the initial and final machine generated status words.

Before describing a typical scatter read, or a scatter write, operation, it might be well to point out that initially, before any operation is to be processed through the computer system, various loading operations are necessary as a preliminary to any program operations of the computer. The preliminary loading operation is utilized to enter into sequential locations of the memory 16 the necessary record control words which define the specific areas or programs of the memory into which data is to be read in, in the case of a tape read operation, or read from, in the case of a tape write operation. In addition, of course, the loading operation must also enter into memory the instructions comprising the main routine or program.

Assuming that the program instructions, as well as the record control words, have all been loaded, the computer or the system may now be in position to process an operation. This may be initiated by setting up the address of the initial instruction into the Instruction Counter 36. The instruction specified by the location in the Instruction Counter 36 is caused to be read out of memory and along the Information bus 15 to the Program Register 24. While this takes place, the Instruction Counter 36 is advanced by "one" so as to be in readiness to address the memory for the next instruction upon the execution of the first program instruction. The course of the program is, of course, directed by the instructions generally taken from the sequential locations of memory.

To explain how the operations of a scatter read are initiated, it will be necessary for the main program routine to contain a tape instruction; for example, the type shown in Fig. 4. When such an instruction is encountered during the course of a program routine, it is fed along the Information bus 15 and into the Program Register 24 in the same manner as any of the preceding instructions have been fed. Immediately upon the entry of the tape instruction into the Program Register 24, the OP portion, positions 0 and 1 of the instruction, are interpreted by the Operation Matrix 33. The results of this interpretation provide for a tape operation call which is passed along line 33*a* to the tape controls unit 10 to initiate preliminary controls and interlocks for a tape operation. The next operation then is initiated by the tape controls to request a memory cycle in order to obtain a timing cycle within which an initial status word can be assembled. This status word will contain the conditions surrounding the initial part of the tape operation and will be stored in a fixed location to facilitate subsequent retrieval thereof under control of retrieval means and appropriate instructions to effect a correction routine.

The initial status word, upon assembly, will contain the address of the first record control word, the point in the program routine where the operation was called for, and this will be specified by the address in the Instruction Counter 36, the tape unit selected, and the tape operation to be performed. All of this information will be assembled in the buffer register B13 from whence it will be issued and stored in the memory in a location specified by the Central Address Generator 78. The initial status word is assembled as follows:

The information contained in the Program Register 24, positions: sign, 0, 1, 6, 7, 8 and 9, are transmitted to the bus 15. At the same time, the address in the Instruction Counter 36 is read out along bus 15*a* to the bus 15 to form positions 2, 3, 4 and 5 of the initial status word. This information is passed on to the buffer register B13 and to locations corresponding to the positions indicated. Next in order, and particularly from positions 4 and 5 of the Program Register portion 28, will the information representing tape operation and tape drive be transmitted to the OPTD unit 21 by way of bus 40*a*, isolation buffer register 40*b*, and bus 40.

A control exercised by the OPTD unit 21 is issued along line 31 to the tape Controls box 7 to select a particular tape drive and the particular operation to be performed. In addition, the OPTD unit 21 passes the operation code to position 1 of the buffer register B13 by way of line 32 to bus 14. Upon the completion of the assembly of the initial status word, a memory cycle is requested; and, when received, the initial status word is stored in a selected location of the memory as determined by the Central Address Generator 78. To initiate a scatter operation, the address of the first record control word in the memory is specified by positions 6, 7, 8 and 9 contained in the tape instruction. This address is read into the Location register 75, the latter in turn transmits this address by way of bus 40 to Core Address Triggers 23 which call out the first record control word in the memory. When the call is honored by the memory, the latter issues the contents of the record control word along the bus 15 to the Record Definition Register 51 placing therein a 4-position start address in the Start register 52 and a 4-position stop address in the Stop register 53. In the next appropriate memory cycle, the information to be read into the location specified by the start address is issued, along the bus 15, from the buffer register B13, this being a scatter read operation (or the contents are selected from the location specified start address and read from memory to the bus 15 if this be scatter write). Assuming that the operation is a scatter read operation, the contents of the register B13 are then passed on by way of the bus 15 during a portion of the memory cycle.

The manner of filling up register B13 from register A12 is under control of appropriate read in and read out controls associated with each of the buffer registers 12 and 13. When the register A12 is filled, a read out control is issued by the register A12 to call for a parallel read out to the bus 14. From the latter, and in the next interval or machine cycle, the information is transmitted in parallel to the register B13. Following this, the register B13 transmits its information to memory in parallel fashion and in less time than is required to enter the next full word from the tape unit to the buffer register A12.

The information read from the tape unit will be eventually collected in the buffer register B13, in the manner explained, and transmitted in parallel, a word at a time, into the location specified by the start address of the record control word. As the first word is transferred to the location specified by the start address, the latter is advanced by "one" under control of the Adder 55 (same type as Adder 38) to provide what may be called a working address, which address specifying where the next tape word of information should be read into (or out from) the memory. Thus, with each word entry into memory, the initial start address is increased by "one." On every cycle of operation, a comparison is made of the working and stop addresses. When an equal condition is reached, indicating equality between the working and stop addresses of the record control word, a test is then made of the sign of the record control word to determine whether the scatter operation is to continue to another location in memory or whether the scatter operation is to terminate. A plus sign will indicate that the operation will continue, however, under control of a new record control word selected from memory. A minus sign indicates the end of the scatter operation in which eventually the tape and other appropriate interlocks will be released.

The operation that develops when the sign in the Sign latch 77 is plus is one in which the Location register 75 issues a new address to the Core Address Triggers 23, the latter calling out the next record control word from the memory. The Location register 75, as earlier explained, is connected to the Adder 55 and causes the initial address in this register 75 to be advanced by "one." The operation of the Adder 55 is controlled in this instance by means of the switches 54 and 57, in turn controlled by lines 81 and 82. Thus, in this manner, adder operations of the Location register 75 are enabled while those of the Start register 52 are disabled. The scattered locations in either a scatter read or a scatter write may be a location constituting a program whose beginning and ending addresses are specified by the start and stop addresses respectively of an associated record control word.

Immediately after the last tape word of information is transferred to memory, the final status word will be generated in the following manner:

The tape control 7 issues a condition digit signal along line 7*a*, bus 14, to position 1 of the buffer register 13. The working address contained in the Start register 52 is transmitted along bus 14 into positions 2–5, inclusive, of the buffer register 13, the address of the last record control word is taken out of the Location register 75 and transmitted along the bus 14 to positions 6–9, inclusive, of the buffer register 13. In addition, the sign of the record control word is transferred into the sign position. After assembly of the final status word, the OPTD unit 21 is again analyzed and issues along line 22 an appropriate signal to the Central Address Generator 78. Concurrently, a tape sync. signal is issued along line 79. Both of these signals control the set up of an appropriate address in the Central Address Generator 78. The address specifies the location in memory into which the final status word will be inserted. A memory signal is next requested and, when honored by the memory, the final status word will be transmitted from the register 13 along bus 14 and to the location specified by the Central Address Generator 78. At the conclusion of the operation, the tape unit automatically stops and sets up a stacking latch to indicate to the system that a certain condition existed during the operation. The stacking latch will be interrogated by means associated with the computer and, depending upon the condition stacked, will cause either an interrupt or a non-interrupt routine operation.

Although the present embodiment shows a pair of registers being used to buffer the information transmitted to or from the tape, it is quite apparent that a single buffer register may be employed in systems where the memory speed is substantially greater than the speed of the peripheral units being serviced.

It may be further appreciated that the Adders 55 and 38 may be adapted to cause selective modification of the start address by values other than "one."

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a data processing system having a memory provided with addressable locations for storing data words and a variety of instruction words, the former being manipulated under control of the latter, programming means controlled by the instructions for controlling the manipulation of the data words, peripheral units including data word transmission means for supplying data words to or receiving data words from said memory under control of appropriate program instructions; the combination of means for effecting, in the memory, scatter read or write operations under control of record control words, each constituted of a sign and a start and a stop address, stored in other addressable locations of the memory comprising: a location address register for receiving and storing the address of a record control word derived from an instruction in said programming means; a record definition register constituted of a sign register, a start address register and a stop address register, respectively, for receiving and storing the sign, the start and stop address of a programmed record control word; address selection control means responsive to the address settings in said start register for selecting a data word location in the memory and for enabling the transmission of the data word; address comparing means connected to said start and stop registers for comparing the address settings and providing an equal signal in response to an equal comparison between said address settings; an adder for advancing the address settings in the start register for each associated data word transmitted to or from the memory; and a record control word sign interrogating means operable in response to an equal comparing signal to provide a control to continue or disable the scatter read or write operations depending upon the character of the sign interrogated.

2. In a data processing system having a memory provided with addressable locations for storing data words and a variety of instruction words, the former being manipulated under conrtol of the latter, programming means controlled by the instructions for controlling the manipulation of the data words, peripheral units including data word transmission means for supplying data words to or receiving data words from said memory under control of appropriate program instructions; the combination of means for effecting, in the momory, scatter read or write operations under control of record control words, each constituted of a sign and a start and stop address, stored in sequential order in other addressable locations of the memory comprising: a location address register for receiving and storing the address of a record control word derived from an instruction in said programming means; a record definition register constituted of a sign register, a start address register and a stop address register, respectively, for receiving and storing the sign, the start and stop address of a programmed record control word; address selection control means responsive to the address settings in said start register for selecting a data word location in the memory and for enabling the transmission of the data word; address comparing means connected to said start and stop registers for comparing the address settings and providing an equal signal in response to an equal comparison between said address settings; on adder for advancing the address settings by one in the start register for each associated data word transmitted to or from the memory; and a record control word sign interrogating means operable in response to an equal comparing signal to provide a control to continue or disable the scatter read or write operations depending upon the character of the sign interrogated.

3. In a data processing system having a memory provided with addressable locations for storing data words and a variety of instruction words, the former being manipulated under control of the latter, programming means controlled by the instructions for controlling the manipulation of the data words, peripheral units including data word transmission means for supply data words to or receiving data words from said memory under control of appropriate program instructions; the combination of means for effecting, in the memory, scatter read or write operations under control of record control words, each constituted of a sign and a start and a stop address, stored in a desired pre-arranged order in other addressable locations of the memory comprising: a location address register for receiving and storing the address of a record control word derived from an instruction in said programming means; a record definition register constituted of a sign register, a start address register and a stop address register, respectively, for receiving and storing the sign, the start and stop address of a programmed record control word; address selection control means responsive to the address settings in said start register for selecting a data word location in the memory and for enabling the transmission of the data word; address comparing means connected to said start and stop registers for comparing the address settings and providing an equal signal in response to an equal comparison between said address settings; an adder for advancing the address settings by a value depending upon the pre-arranged order of the stored record control words in the start register for each associated data word transmitted to or from the memory; and a record control word sign interrogating means operable in response to an equal comparing signal to provide a control to continue or disable the scatter read or write operations depending upon the character of the sign interrogated.

4. In a data processing system having a memory provided with addressable locations for storing data words and a variety of instruction words, the former being manipulated under control of the latter, programming means controlled by the instructions for controlling the manipulation of the data words, peripheral units including data word transmission means for supplying data words to or receiving data words from said memory under control of appropriate program instructions; the combination of means for effecting, in the memory, scatter read or write operations under control of record control words, each constituted of a sign and a start and a stop address, stored in a pre-arranged order in other addressable locations of the memory comprising: a location address register for receiving and storing the address of a record control word derived from an instruction in said programming means; a record definition register constituted of a sign register, a start address register and a stop address register, respectively, for receiving and storing the sign, the start and stop address of a programmed record control word; address selection control means responsive to the address settings in said start register for selecting a data word location in the memory and for enabling the transmission of the data word; address comparing means connected to said start and stop registers for comparing the address settings and providing an equal signal in response to an equal comparison between said address settings; an adder for advancing the address settings selectively by values depending upon the prearranged order of the stored record control words in the start register for each associated data word transmitted to or from the memory; and a record control word sign interrogating means operable in response to an equal comparing signal to provide a control to continue or disable the scatter read or write operations depending upon the character of the sign interrogated.

5. In a data processing system having a memory provided with addressable locations for storing data words and a variety of instruction words, the former being manipulated under control of the latter, programming means controlled by the instructions for controlling the manipulation of the data words, peripheral units including data word transmission means for supplying data words to or receiving data words from said memory under control of appropriate program instructions; the combination of means for effecting, in the memory, scatter read or write operations under control of record control words, each constituted of a sign and a start and a stop address, stored in other addressable locations of the memory comprising: a location address register for receiving and storing the address of a record control word derived from an instruction in said programming means; a record definition register constituted of a sign register, a start address register and a stop address register, respectively, for receiving and storing the sign, the start and stop address of a programmed record control word; address selection control means responsive to the address settings in said start register for selecting a data word location in the memory and for enabling the transmission of the data word; address comparing means connected to said start and stop registers for comparing the address settings and providing an equal signal in response to an equal comparison between said address settings; an adder for advancing the address settings in the start register for each associated data word transmitted to or from the memory; and a record control word sign interrogating means operable in response to an equal comparing signal to cause the next record control word to be selected and entered into said record definition reggister whereby scatter operations are continued.

6. In a data processing system having a memory provided with addressable locations for storing data words and a variety of instruction words, the former being manipulated under control of the latter, programming means controlled by the instructions for controlling the manipulation of the data words, peripheral units including data word transmission means for supplying data words to or receiving data words from aid memory under control of appropriate program instructions; the combination of means for effecting, in the memory, scatter read or write operations under control of record control words, each constituted of a sign and a start and a stop address, stored in other addressable locations of the memory comprising: a location address register for receiving and storing the address of a record control word derived from an instruction in said programming means; a record definition register constituted of a sign register, a start address register and a stop address register, respectively, for receiving and storing the sign, the start and stop address of a programmed record control word; address selection control means responsive to the address settings in said start register for selecting a data word location in the memory and for enabling the transmission of the data word; address comparing means connected to said start and stop registers for comparing the address settings and providing an equal signal in response to an equal comparison between said address settings; an adder including connections connectable to either said start register or said location register to advance the address settings of said registers; switching means normally operable to establish connections between said start register and said adder; a record control word sign interrogating means operable in response to an equal comparing signal to establish connections between said location register and said adder to advance the location address; and means responsive to the location address to address another record control word for selecting the next record block of locations in memory.

7. In a data processing system having a memory provided with addressable locations for storing data words and a variety of instruction words, the former being manipulated under control of the latter, programming means controlled by the instructions for controlling the manipulation of the data words, peripheral units including data word transmission means for supplying data words to or receiving data words from said memory under control of appropriate program instructions; the combination of means for effecting, in the memory, scatter read or write operations under control of record control words, each constituted of a sign and a start and a stop address, stored in sequential order in other addressable locations of the memory comprising: a location address register for receiving and storing the address of a record control word derived from an instruction in said programming means; a record definition register constituted of a sign register, a start address register and a stop address register, respectively, for receiving and storing the sign, the start and stop address of a programmed record control word; address selection control means responsive to the address settings in said start register for selecting a data word location in the memory and for enabling the transmission of the data word; address comparing means connected to said start and stop registers for comparing the address settings and providing an equal signal in response to an equal comparison between said address settings; an adder including connections connectable to either said start register or said location register to advance the address settings of said registers by one; switching means normally operable to establish connections between said start register and said adder; a record control word sign interrogating means operable in response to an equal comparing signal to establish connections between said location register and said adder to advance the location address by one; and means responsive to the location address to address the next sequentially ordered record control word for selecting another record block of locations in memory.

8. In a data processing system having a memory provided with addressable locations for storing data words and a variety of instruction words, the former being manipulated under control of the latter, programming means controlled by the instructions for controlling the manipulation of the data words, peripheral units including data word transmission means for supplying data words to or receiving data words from said memory under control of appropriate program instructions; the combination of means for effecting, in the memory, scatter read or write operations under control of record control words, each constituted of a sign and a start and a stop address, stored in a desired pre-arranged order in other addressable locations of the memory comprising: a location address register for receiving and storing the address of a record control word derived from an instruction in said programming means; a record definition register constituted of a sign register, a start address register and a stop address register, respectively, for receiving and storing the sign, the start and stop address of a programmed record control word; address selection control means responsive to the address settings in said start register for selecting a data word location in the memory and for enabling the transmission of the data word; address comparing means connected to said start and stop registers for comparing the address settings and providing an equal signal in response to an equal comparison between said address settings; an adder, including connections connectable to either said start register or said location register, adapted to advance the address settings of said location register by a value depending upon the pre-arranged order of the stored record control words, and to advance said start register by one; switching means normally operable to establish connections between said start register and said adder; a record control word sign interrogating means operable in response to an equal comparing signal to establish connections between said location register and said adder to advance the location address; and means responsive to the location address to address the next record control word in said prearranged order for selecting the next record block of locations in memory.

9. In a data processing system having a memory provided with addressable locations for storing data words and a variety of instruction words, the former being manipulated under control of the latter, programming means controlled by the instructions for controlling the manipulation of the data words, peripheral units including data word transmission means for supplying data words to or receiving data words from said memory under control of appropriate program instructions; the combination of means for effecting, in the memory, scatter read or write operations under control of record control words, each constituted of a sign and a start and a stop address, stored in sequential order in other addressable locations of the memory comprising: a location address register for receiving and storing the address of a record control word derived from an instruction in said programming means; a record definition register constituted of a sign register, a start address register and a stop address register, respectively, for receiving and storing the sign, the start and stop address of a programmed record control word; address selection control means responsive to the address settings in said start register for selecting a data word location in the memory and for enabling the transmission of the data word; address comparing means connected to said start and stop registers for comparing the address settings and providing an equal signal in response to an equal comparison between said address settings; an adder, including connections connectable to either said start register or said location register, adapted to advance the address settings of said registers by one; switching means normally operable to establish connections between said start register and said adder; a record control word sign interrogating means operable in response to an equal comparing signal to establish connections between said location register and said adder to advance the location address; means responsive to the location address setting to address the next sequentially ordered record control word for selecting the next record block of locations in memory; and means responsive to appropriate initiating and terminating signals generated respectively at the start and end of a scatter operation to assemble appropriate initial and final status words reflecting respectively initial conditions and associated initial instructions, and the final instructions with the conditions developed during the course of operations.

10. In a data processing system having a memory provided with addressable locations for storing data words and a variety of instruction words, the former being manipulated under control of the latter, programming means controlled by the instructions for controlling the manipulation of the data words, peripheral units including data word transmission means for supplying data words to or receiving data words from said memory under control of appropriate program instructions; the combination of means for effecting in the memory scatter read or write operations under control of record control words, each constituted of a sign and a start and a stop address, stored in other addressable loctions of the memory comprising: a location address register for receiving and storing the address of a record control word derived from an instruction in said programming means; a record definition register constituted of a sign register, a start address register and a stop address register, respectively, for receiving and storing the sign, the start and stop address of a programmed record control word: address selection control means responsive to the address settings in said start register for selecting a data word location in the memory and for enabling the transmission of the data word; address comparing means connected to said start and stop registers for comparing the address settings and providing an equal signal in response to an equal comparison between said address settings; an adder, including connections connectable to either said start register or said location register, adapted to advance the address settings of said registers; switching means normally operable to establish connections between said start register and said adder; and a record control word sign interrogating means operable in response to an equal comparing signal to either establish connections between said location register and said adder to advance the location address, or to terminate said scatter operation depending upon the character of the interrogated sign.

References Cited in the file of this patent

UNITED STATES PATENTS 2,797,862 Andrews ---------------- July 2, 1957